Jan. 10, 1939.    R. ANSCHÜTZ    2,143,428
TYPEWRITING AND CALCULATING MACHINE
Filed Feb. 5, 1932    8 Sheets-Sheet 2
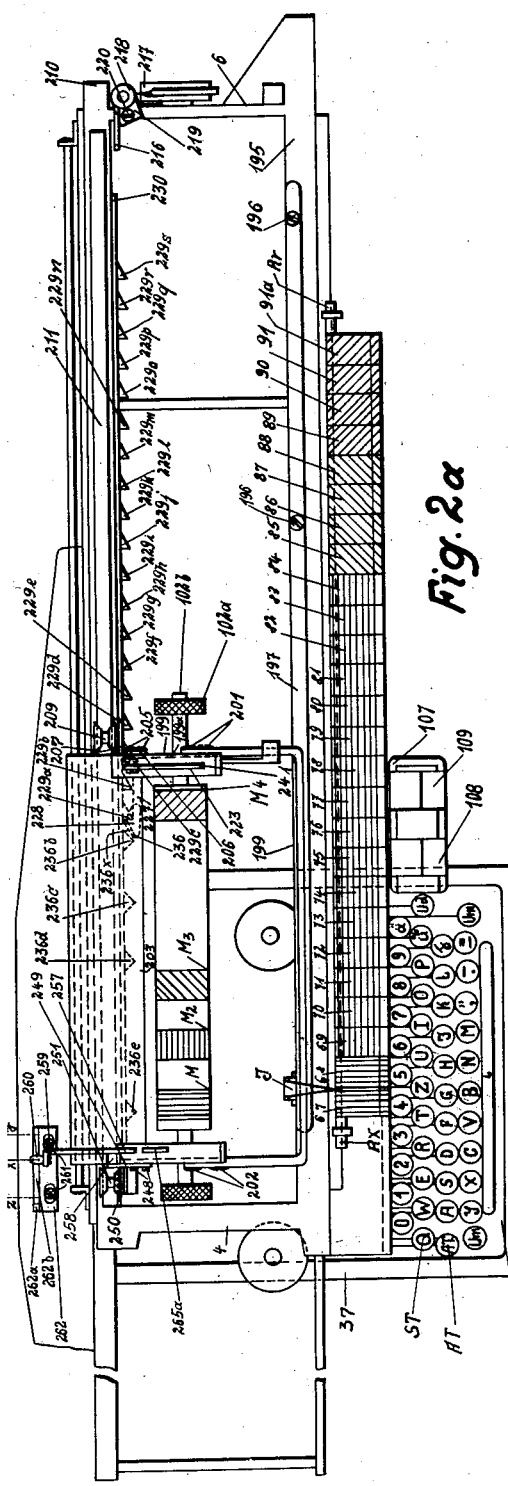
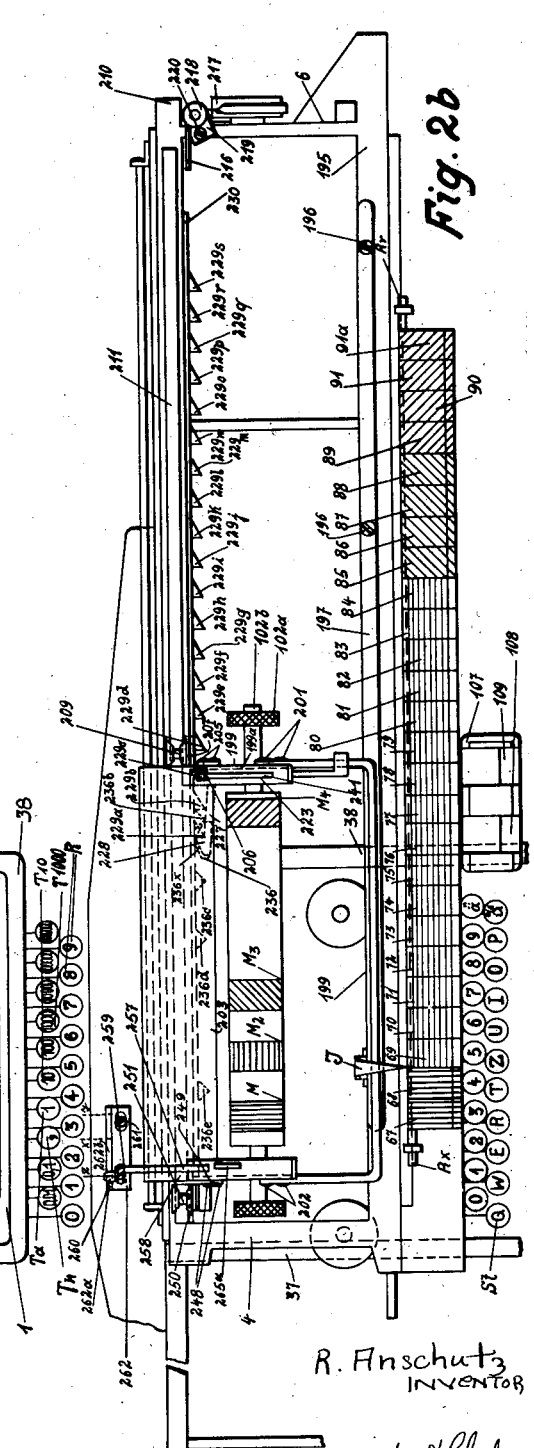
R. Anschütz
INVENTOR
By Marks & Clerk
Attys.

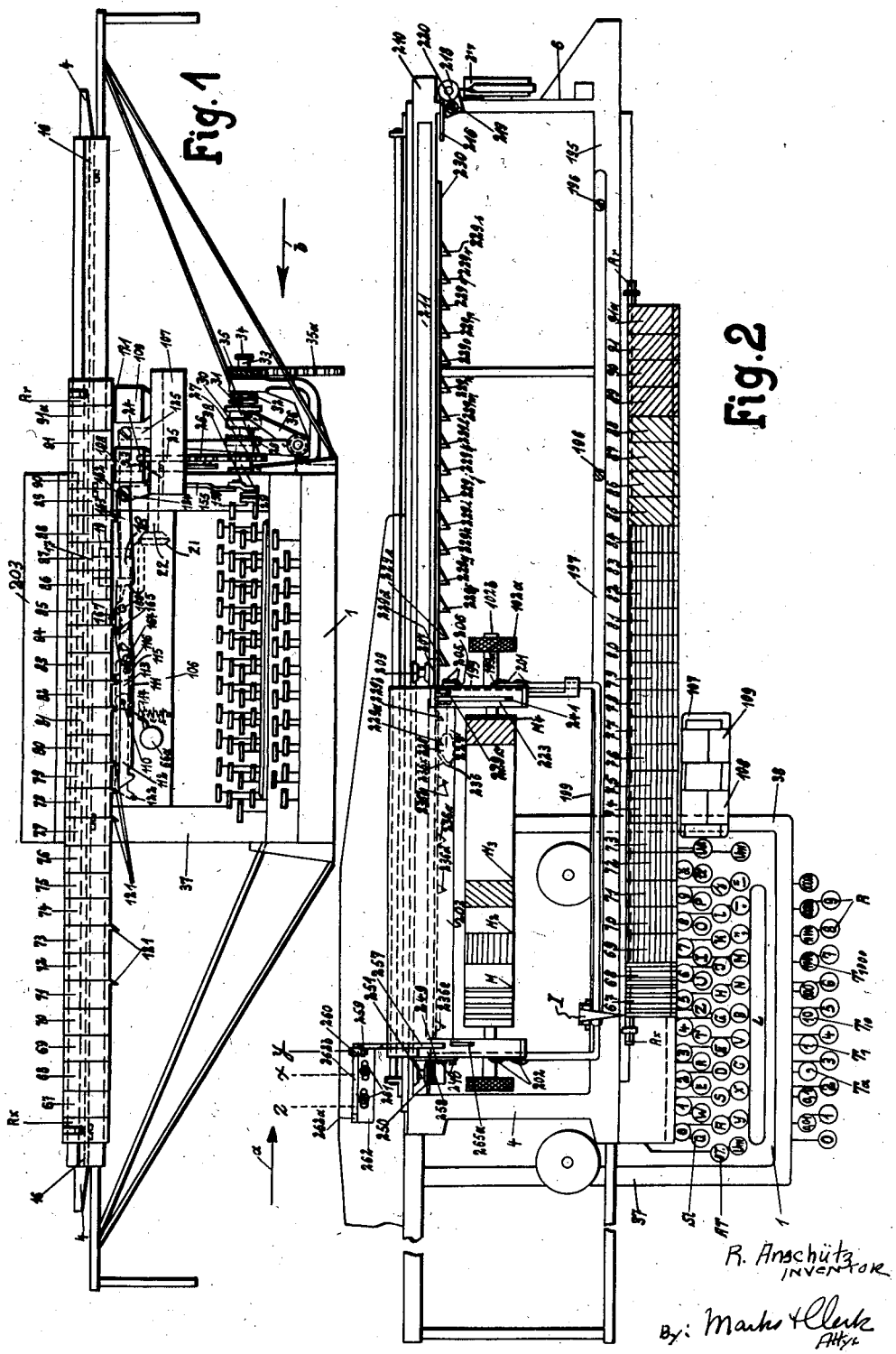

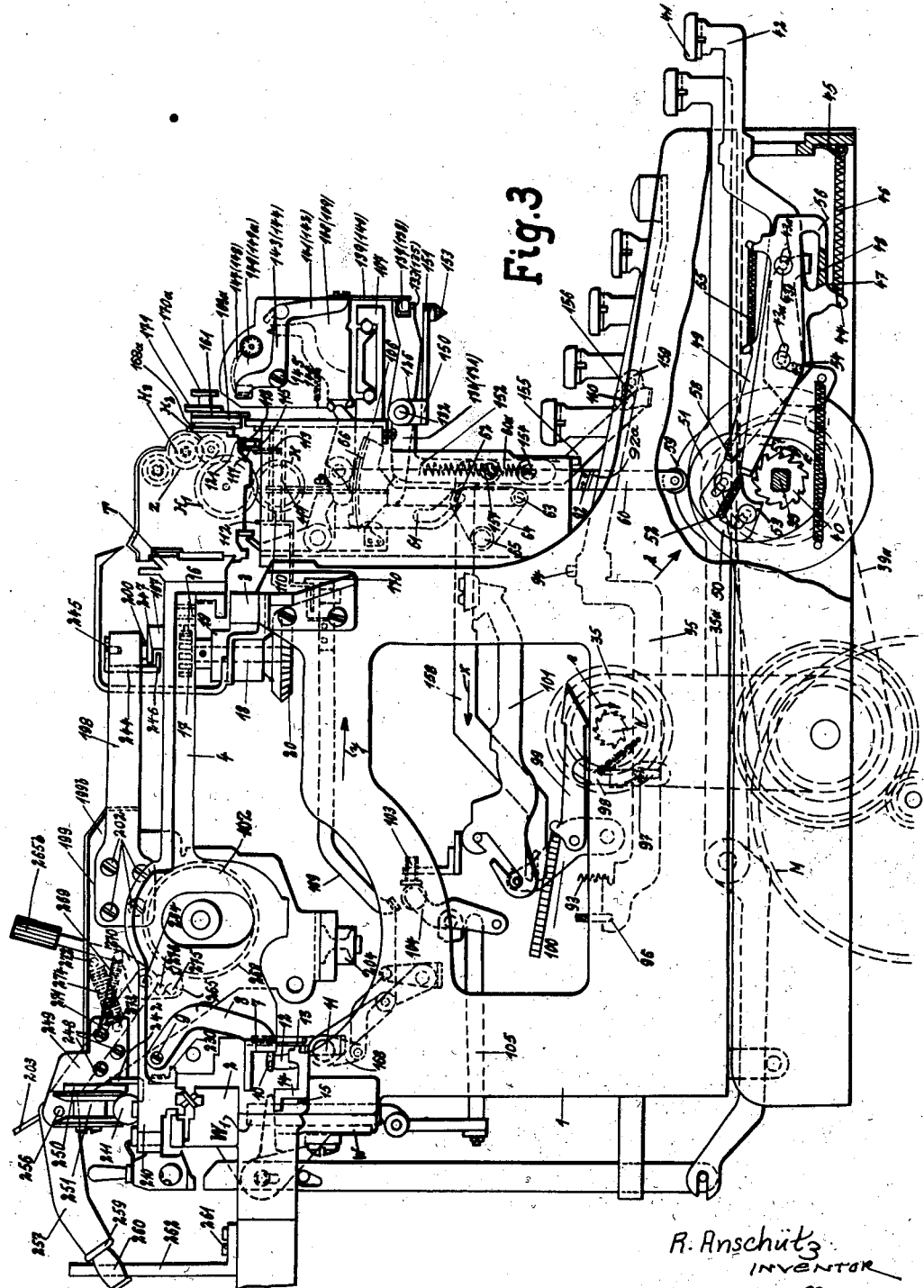

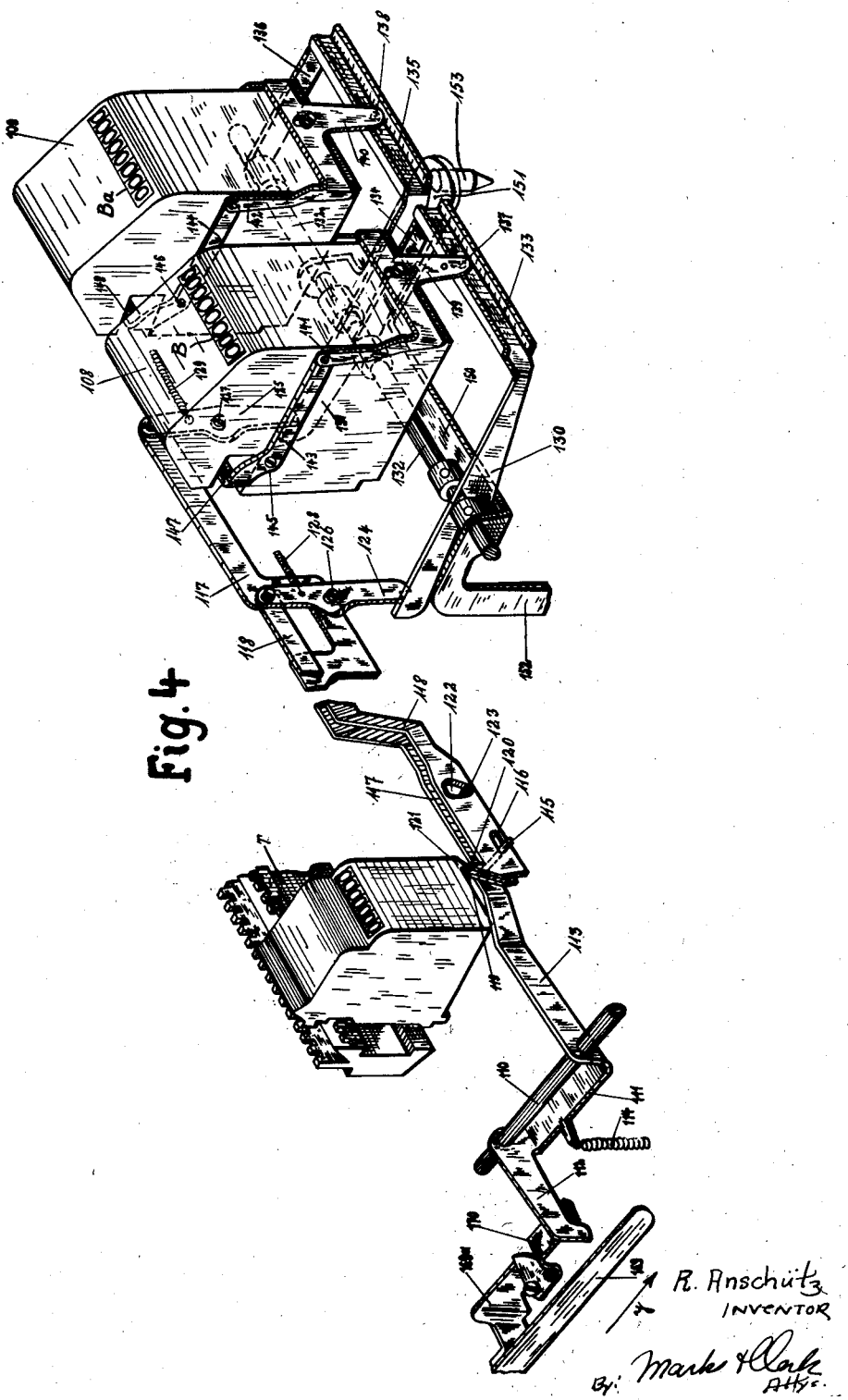

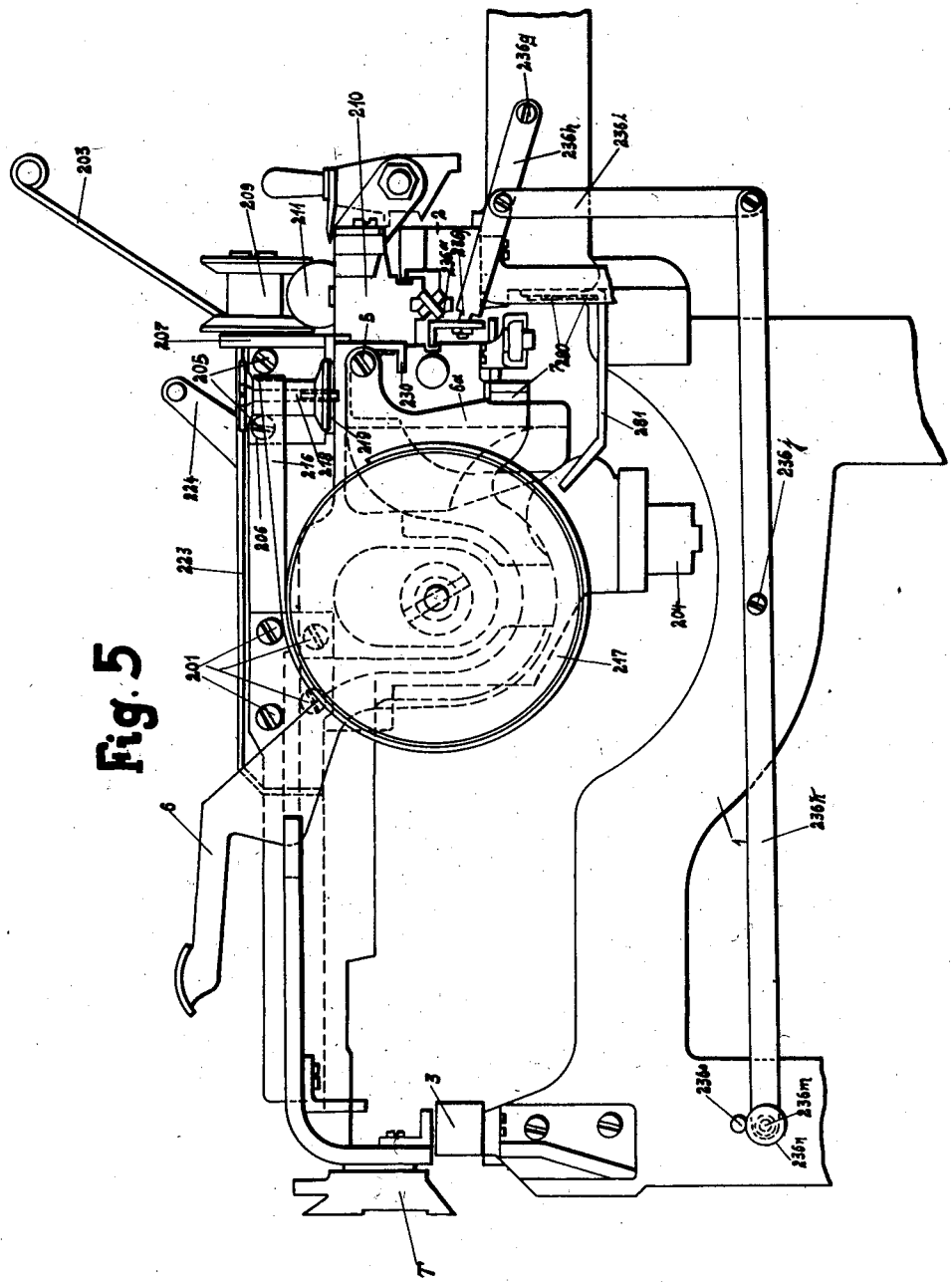

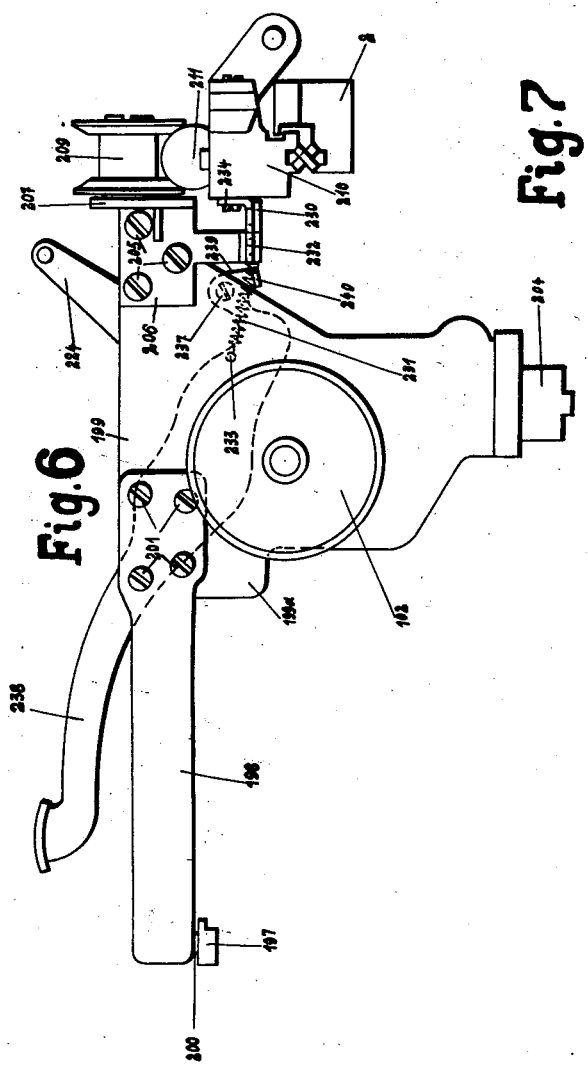

Fig. 40

Patented Jan. 10, 1939

2,143,428

UNITED STATES PATENT OFFICE 2,143,428

TYPEWRITING AND CALCULATING MACHINE

Robert Anschütz, Zella-Mehlis, Germany, assignor to Mercedes Büromaschinen-Werke Aktiengesellschaft, Zella-Mehlis, Germany Application February 5, 1932, Serial No. 591,198
In Germany February 14, 1931

17 Claims. (Cl. 197—127)

This invention relates to combined typewriting and calculating machines.

In combined typewriting and calculating machines as hitherto known, it is only possible to add up the amounts which succeed one another in horizontal series in the column totalizers which are arranged on the paper carriage, and to calculate the sum and difference of these amounts in the cross totalizers.

In the case when definite forms have to be completed, it is, however, desirable to add the amounts which succeed one another in vertical series in the column totalizers and also, of course, to calculate the sum and difference of these amounts in the cross totalizers.

According to the invention, the above method of calculation is rendered possible by means of a totalizer carriage which is controlled by the usual escapement and a paper carriage displaceable independently of the totalizer carriage.

The accompanying drawings illustrate, by way of example, one form of construction of the invention.

Figure 1 shows a front elevation of a power-driven combined typewriting and calculating machine provided with the invention.

Figure 2 shows a plan of the combined typewriting and calculating machine illustrated in Figure 1, the left-hand portion of the frame having a section omitted on account of its dimensions.

Figures 2a and 2b show plan views according to Fig. 2 with different carriage positions.

Figure 3 illustrates, on an enlarged scale, a side elevation, viewed in the direction of the arrow a, of the combined typewriting and calculating machine shown in Figure 1.

Figure 4 is a perspective view taken from the front left-hand side of the "clear sign" impression device with the two cross totalizers.

Figure 5 shows a side elevation of the upper part of the machine, in actual size, viewed in the direction of the arrow b in Figure 1.

Figure 6 shows a side elevation of the carriage which supports the platen, also in actual size, viewed in the direction of the arrow b in Figure 1.

Figure 7 is a diagrammatic front elevation of the totalizer rail arranged on a combined typewriting and calculating machine with the column totalizers and the driving members for the cross totalizers.

Figure 10 shows a form, on a reduced scale, which can be completed in a machine constructed according to the invention.

Figures 8, 9:
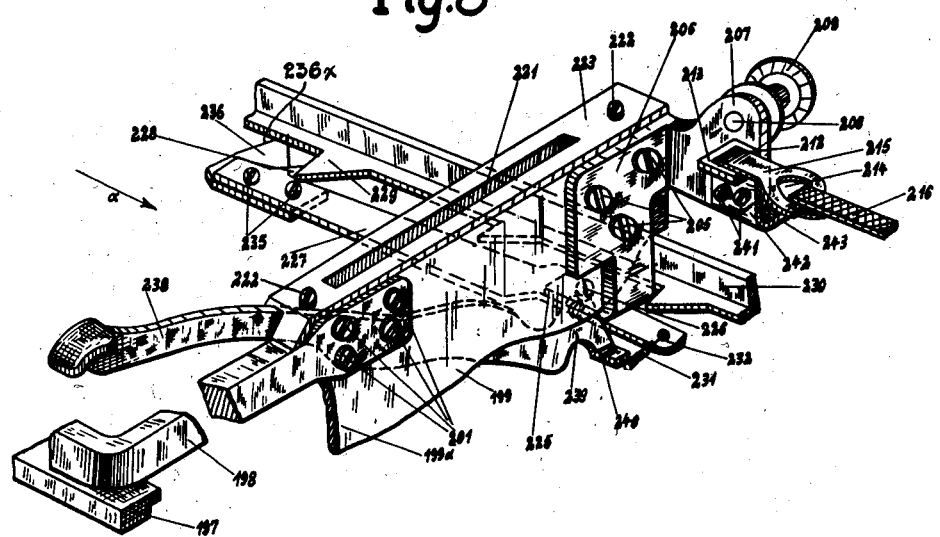
Figure 8 shows a perspective view of a detail of Figure 6.
Figure 9 shows a perspective view, taken from the front left-hand side of the machine, of a detail in Figure 3.

A description of the known Mercedes "Addelektra" combined typewriting and calculating machine to which the invention has been applied, by way of example, is as follows:—

The machine frame 1, Figure 3, supports, by means of the rails, 2 and 3, a carriage frame 4 which has a length, for example, of 85 cm. In this carriage, however, no platen is arranged. The purpose of this arrangement will be explained hereinafter in a detailed manner. On the right-hand side of the carriage frame, 4, the carriage release lever, 6, is mounted on a screw, 5, Figures 2 and 5, so that it can swing in a downward direction, and on its extension, 6a, one end of the carriage release rail, 7, Figure 3, is secured. The rail, 7, at its other end, is rigidly attached to a lever, 8, which is arranged on the left-hand side of the carriage frame, 4, and which is mounted on a screw, 9, so that it can pivot thereon. If the carriage release lever is depressed, then the carriage release rail, 7, acts, by way of the parts, 10 to 15, upon the loose tooth of the usual typewriter escapement and withdraws it, whereupon the carriage frame, 4, may be freely moved to the right or to the left.

For the purpose of returning the carriage frame, 4, into position, a rack, 16, is secured to it, Figures 1 and 3. The rack, 16, is in mesh with a gear wheel, 17, which is secured to the axle 18, by a pin. The axle, 18, is mounted in a small fixed pedestal bearing, 19, and on its end, remote from the gear wheel, 17, it supports a bevel wheel, 20. With the bevel wheel, 20, a bevel wheel, 21, Figure 1, engages, the latter wheel being secured to an axle, 22. The axle, 22, is rotatably mounted in a bearing, 23, which is rigidly attached to the machine frame, and this axle is provided at its other end with a spur wheel, 24, which meshes with the spur wheel, 25. The spur wheel, 25, meshes with the spur wheel, 26, which in turn, meshes with the spur wheel, 27. The spur wheel, 27, is secured to the coupling member, 28, and together with the latter is mounted loosely and rotatably but so as to be incapable of axial displacement, on the portion, 29, of the toothed shaft, N, Figure 3, which actuates the type levers. On the shaft portion, 29, a second coupling member 30, is also mounted which in contradistinction to the coupling member, 28, is so arranged with respect to the shaft portion, 29, that it cannot rotate thereon, but can be displaced in an axial direction. On the free end of the shaft portion, 29, is arranged a further coupling member, 31, which, if required, may be coupled with a corresponding coupling member, 32, by displacing the shaft, 33, which carries the coupling member, 32, by means of a knob, 34, from its position as shown in Figure 1, towards the left. The shaft, 33, is adapted to be rotated in the direction e by means of a chain wheel, 35, which is keyed to it, and the chain, 35a, Figure 3, driven by the motor, M.

The return movement of the carriage is effected, provided that the coupling members, 31 and 32, are engaged, in a known manner, the coupling member, 30, being engaged with the coupling member, 28, by a lever, 36, which is actuated by the right-hand margin setter, Rr, through suitable mechanism which is not shown in the drawings, and this causes, by means of the already mentioned gear wheels, 17 to 27, the return movement of the carriage to the right. The disengagement of the coupling members, 28 and 30, is effected by the left-hand margin setter, Rx, when the carriage frame 4, arrives at its extreme right-hand position. The line spacing of the platen is, in the present case, not effected in the usual manner, in dependence upon the carriage return mechanism, but in dependence upon the carriage movement in a manner which will be hereinafter described.

In the two side walls, 37 and 38, Figure 1, of the frame, 1, bearings are arranged in which the driving shaft, 39, Figure 3, for driving the differential members, is mounted. The shaft, 39, is driven by a chain, 39a, from the motor, M, in the direction of the arrow, c. The ratchet wheel, 40, is arranged on the shaft, 39, and participates in its movement. A similar ratchet wheel, 40, is provided for each of the ten calculating keys, 41. The calculating key levers, 42, are mounted on the machine frame, 1, in such a manner that they can pivot around the shaft, 43, and are held in the position shown in Figure 3, by the springs, 46, which are attached at one end to the hooks, 44, of the calculating key levers, and, at the other end, to the fixed hooks, 45, this position being determined by the contact of the noses, 47, on the calculating key levers with the stop bar, 48.

If a key, 41, is depressed, then the key lever, 42, pivots around the shaft, 43, in a clockwise direction, and its arm, 49, which extends in a rearward direction, releases the pawl, 50, which is slidably mounted on the cam, 51, the latter being mounted on the shaft, 39, in such a manner that it can rotate freely thereon. In consequence of this the pawl, 50, under the action of the compression spring, 52, which acts upon it, moves in the direction of the arrow, d, and its nose, 53, engages with the continuously rotating ratchet wheel, 40. This engagement causes the cam, 51, which corresponds to the depressed key, 41, to be coupled to the ratchet wheel, 40, and therefore with the shaft, 39, for one revolution only.

The swinging movement of the lever, 42, also causes a member, 54, which is slidably mounted on the lever by means of the pin-and-slot connections, 43, 43a and 43b and 43c, to be moved towards the left so that the hook, 56, engages under the stop bar, 48, by the action of the spring, 55, which at one end is connected to the member, 54, and at the other end to the arm 49 of the lever, 42. The nose, 57, of the member, 54, is thereby caused to move into the path of the nose, 58, of the pawl, 50, which in the meantime has been released and has moved past the arm, 49, and the nose, 57, in the direction of the arrow, c, and the key lever, 42, is locked in its depressed position by the nose, 56, of the member, 54. The revolution of the cam, 51, causes the differential member, 60, the roller, 59, of which contacts with the cam, to move in a downward direction under the action of the spring, 60a, and thereafter to be moved upwards by the rotating cam, 51. The movement of the differential member, 60, causes a slot, 61, therein, which slot is shaped to correspond to the value of the particular key, 41, depressed, to act upon a shaft, 62, of an oscillatable frame fixed to the rotatably mounted shaft, 63, and consisting of a number of plates, 64, fixed on the shaft, 63, the above mentioned shaft, 62, and another shaft, 65, which acts as a stiffening stay. The oscillation of the frame, 62, to 65, causes a swinging movement of a one-way toothed segment, 66, fixed to the shaft, 63, and this movement of the toothed segment causes, through a reversing gear which is not shown in the drawings and which can be adjusted by means of the knob, 66a, Figure 1, the main driving wheel, H, of the column totalizers to be rotated either in an additive or subtractive sense, according to the position in which the knob, 66a, has been set. If one of the column totalizers, 67 to 91a, which are attached to the supporting rail, T, of the carriage, 4, is in the operative position, the main driving wheel, H, then transmits the amount by way of the corresponding driving wheel, H1, and the wheel, H2, of the corresponding column totalizer to the wheel, H3, of the number wheels, Z, whereby the latter are positioned to correspond to the amount introduced.

After the cam, 51, has made a complete revolution, the nose, 58, of the pawl, 50, abuts against the nose, 57, of the member, 54, whereby the cam, 51, is disengaged from the ratchet wheel, 40. The contact of the pawl, 50, with the nose, 57, of the member, 54, causes the latter also to move against the action of the spring, 55, into the position shown in Figure 3, which returns the key lever, 42, into its rest position and retains the cam, 51, by means of its arm 49, instead of this retention being effected by the nose, 57, of the member, 54.

On each differential member 60, an angle piece 92, Figure 3, is fixed. The horizontal leg 92a of each of these angle pieces overlies the corresponding numeral writing key lever 95. If, for instance, the "3"-calculating key 41 has been depressed, its appertaining differential member 60 moves downwards. Consequently, the latter by means of the horizontal leg 92a of its angle piece 92, takes the "3"-numeral writing key lever 95 along with it which under the action of its spring 93 is normally held against the stop bar 94. If, therefore, the differential member 60 moves downwards, the corresponding numeral writing key lever 95 swings around its pivot 96 against the action of its spring 93. The pawl, 98, which is mounted on a pin, 97, on the key lever, 95, causes the coupling hook, 99, to engage with the toothed shaft, N, which rotates continuously in the direction of the arrow, e, so that the coupling hook is moved by the toothed shaft towards the right, Figure 3.

The above movement of the coupling hook, 99, causes, by means of an intermediate lever, 100, the type lever, 101, to strike against the platen, 102, the platen, 102, being arranged in a carriage, 199, which moves with the carriage, 4; in this manner, the amount registered is printed. The type lever, 101, acts in a known manner through the parts, 103 to 105, Figure 3, on the carriage escapement, whereby the carriage, 4, and consequently also the paper carriage, 199, which moves in the latter, and will be hereinafter described, are moved one step towards the left by means of the usual spring drum.

In the front of the machine frame, 1, the totalizers are mounted, and on its front wall, 106, Figures 1 and 3, is arranged a bracket, 107, which supports two cross totalizers, 108 and 109, which are movable together in a lateral direction. With each of the cross totalizers, 108 and 109, is connected a set of links for the "clear sign" impression device which in the following is shortly described for the purpose of a better understanding of the invention itself.

On a shaft, 110, Figures 1, 3 and 4, which rests in supports on the machine frame, a two-armed lever, consisting of the bridge member, 111 and arms, 112 and 113, is rotatably mounted and is acted upon by a spring, 114, in the anticlockwise direction around the shaft, 110. A pin, 115, which is riveted to the arm, 113, Figure 4, projects into the slots, 116, of two levers, 117 and 118. The levers, 117 and 118, are provided with hooks, 119 and 120, which act in conjunction with the projections, 121, arranged on the column totalizers, 71, 73, 77, 78, 79, 81, 82, 84, 88 and 91a. The projections, 121, of the column totalizers, 71, 78, 81, 84 and 91a, act upon the hook, 120, of the lever, 118, and the projections, 121, of the column totalizers, 73, 77, 79, 82 and 88, act upon the hook, 119, of the lever, 117. The levers, 117 and 118, are provided with triangular openings, 122, into which projects a pin, 123, which is fixed to the machine frame. The levers, 117 and 118, are pivotably interconnected with the levers, 124 and 125, which are arranged on the machine frame in such a manner as to be capable of pivoting on the screws, 126 and 127. The levers, 124 and 125, are acted upon by the tension springs, 128 and 129, in a clockwise direction. The levers, 124 and 125, co-act with the levers, 130 and 131, which are arranged on the shaft, 132, so that they can pivot freely thereon, the latter shaft, 132, being arranged under the bracket, 107, Figure 3.

The lever, 130, is connected at its forwardly directed end, Figure 4, by means of a U-shaped rail, 133 with the similarly disposed end of a lever, 134, which is rotatably mounted on the shaft, 132, and the lever, 131, is similarly connected by means of a U-shaped rail, 135, with the lever, 136, which is rotatably mounted on the shaft, 132.

The U-shaped rails, 133 and 135 are slidably connected by means of the rollers, 137 and 138, with displaceable sliding members, 139 and 140, which can move vertically on the front of the cross totalizers, 108 and 109. Each of the slides, 139 and 140 has two arms, 141 and 142, which extend upwardly and which are pivotably connected with the two-armed levers 143 and 144. The pairs of levers, 143 and 144, are interconnected by feeler rails, 147 and 148, respectively, so as to form a U-bend, the feeler rails being shaped like a rake. The rails, 147 and 148, co-act with the number wheel driving wheels, 149, 149a, Figure 3, which in a known manner, have a shortened tooth in the position which corresponds to the zero position of the number wheels, B, Ba.

On the shaft, 132, Figure 4, a two-armed lever consisting of a bridge member, 150 and arms, 151 and 152, is rotatably mounted. The arm, 151, is provided with a knob, 153. To the arm, 152, Figure 3, which extends downwards, a lever, 155, is connected by means of a screw, 154, the lever at its free end being provided with a curved slot, 156. To the arm, 152, is pivotably connected, by means of a screw, 157, a link, 158, the free end of which is fork-shaped and embraces in a known manner a pin on the intermediate lever co-acting with the type lever which carries the "clear sign" type. The key lever, 159, Figure 1, by means of which the "clear sign" type lever is struck, is not provided with a key, but is connected with the lever, 155, by means of a pin, 160, Figure 3, which projects into the slot, 156, on the lever, 155. Further, the key lever, 159, acts also upon the "clear sign" type lever through parts which are similiar to those described by the references, 97 to 100.

The column totalizers, 67 to 91a, are provided with engaging members, 161, Figure 3, which project into the path of a coupling member connected by means of a screw, 162, Figure 1, with the left-hand cross totalizer, 108. At the other end the coupling member which in the main consists of the link, 163, engages, by means of a pin, 164, in a horizontal slot, not shown, in the front wall, 106, of the calculating mechanism. The coupling member has further a hook, 165, which is pivotably connected, by means of a pin, 166, with the rod, 163, and is maintained in its operative position by means of a spring which is not shown in the drawings. A second hook, 167, serves, as is known, for the purpose of preventing the mechanism over-shooting its position on the return movement. The cross totalizers, 108 and 109, as well as the coupling link, 163, are maintained in their normal position as illustrated in Figure 1, by a spring which is not shown in the drawings. The coupling links, as is known, have the function of carrying the cross totalizers, 108 and 109, along with each column totalizer to the left, until the amount to be registered in the lowest denominational position has been registered, whereupon the cross totalizers are automatically disengaged from the column totalizers and spring back to the right under the action of their springs, after which they are carried along to the left by the next column totalizer.

The "clear sign" impression device is disengaged by the carriage release lever, 6, through the parts 7, 10, 11 and 168 to 170, Figures 3 and 4. When the carriage release lever, 6, is depressed it swings around the screw 5 (Fig. 5) in the anticlockwise direction. Inasmuch as the angle-shaped bar 7 (Figs. 5 and 3) is fixed to the carriage release lever 6 and to the lever 8 (Fig. 3), the parts 6—7—8 are swinging together as a whole around the aligned pivots 5 (Fig. 5) and 9 (Fig. 3) of the levers 6 and 8 in the clockwise direction with regard to Fig. 3. Consequently, the angle-shaped bar 7 acts upon the roller 10 of the lever 12. Owing to the fact that the lever 12 and the lever 168 are in rigid connection with the shaft 11, the parts 10, 12, 11 and 178 are rocked in anti-clockwise direction and, the rod, 169, moves in the direction of the arrow y and thereby operates, by means of the member, 169a, the cranked lever, 170, Figure 4, in a clockwise direction, whereby the latter with its forwardly directed arm, moves the two-armed lever, 112, 111, 113, around the shaft, 110, in a clockwise direction. This movement causes the pin, 115, to move the levers, 117 and 118, in a downward direction and brings the hooks, 119 and 120, which are on the latter, out of the path of the projections, 121, of the column totalizers, 71, 73, 77, 78, 79, 81, 82, 84, 88 and 91a. It is impossible, therefore, for the "clear sign" impression devices to be actuated during the displacement of the carriage, 4, by means of the carriage release lever, 6.

By means of the two setting plates, 168a and 169a, Figure 3, the cross totalizers, 108 and 109, are adjusted for addition, subtraction or are disengaged. The setting plate, 168a, serves to control the type of calculation in the cross totalizer, 109, and the setting plate, 169a serves to control the type of calculation in the cross totalizer, 108. The setting plate, 168a, is adjusted by the knob, 170a, and the setting plate, 169a, is adjusted by the knob, 171, in the manner described in U. S. Patent 1,349,024. In this patent, the setting plates are shown in Figures 7 to 13 and designated by reference numerals 45 and 46. The setting plates, 168a and 169a, are adapted to actuate the cranked levers, 172 and 173, Figure 7, which are pivotably mounted on the pins, 174 and 175, on the front wall of the calculating mechanism. The levers, 172 and 173, are acted upon by the spring, 176, in such a manner that they abut against the stop pins, 177 and 178, which are arranged in the machine frame, and this determines their normal position. The cranked lever, 172, is pivotably connected by means of a connecting rod, 179, with a lever, 181, which is pivotably mounted on the shaft, 180. A pin, which is arranged on the lever, 181, and which is not shown in the drawings engages in an annular groove in a gear wheel, not shown, and which is driven through intermediate gearing by the toothed segment, 66, the above mentioned gear wheel being normally in mesh with the gear wheel, 182, which is secured to a hollow shaft, 183. On the right-hand end of the hollow shaft, 183, is secured a gear wheel, 184, which meshes correspondingly to the decimal positions, with the transmission gears of the left-hand cross totalizer, 108, as soon as the latter is carried along by a column totalizer. On the left of the gear wheel, 182, a second gear wheel, 185, is secured to the hollow shaft, 183, and is constantly in mesh with an intermediate gear wheel, 187, which is rotatably mounted on a pin. If the gear wheel, which is not shown on the drawings, is in mesh with the gear wheel, 182, then the number wheels of the cross totalizer, 108, which are not shown in the drawings are operated in an additive sense. If on the contrary, the said gear wheel lies between the gear wheel, 182, and the gear wheel, 187, then the cross totalizer, 108, is not operated at all. If, finally, the said gear wheel is meshed with the intermediate gear wheel, 187, then the cross totalizer, 108, is actuated in a subtractive sense.

The setting plate, 168a, operates in conjunction with the cranked lever, 173. The lever, 173, is pivotally connected with a lever, 189, by means of a connecting rod, 188. On the free end of the lever, 189, is arranged a pin, which is not shown in the drawings, and which engages with an annular groove on a gear wheel which also is not shown on the drawings and which is actuated by the toothed segment, 66. On a shaft, 190, a gear wheel, 191, and a gear wheel, 192, are arranged. If the gear wheel which is not shown in the drawings, is in direct mesh with the gear wheel, 191—which occurs when the lever, 189, is in the position illustrated in Figure 7—then the number wheels of the cross totalizer, 109, are operated in the additive sense by a gear wheel, 193, which is secured to the shaft, 190. If the above mentioned gear wheel lies between the two gear wheels, 191 and 192, then the number wheels of the cross totalizer, 109, are not actuated at all. If, however, the said gear wheel is meshed with the intermediate wheel, 194, which is loosely arranged on the pin, 186, then the number wheels of the cross totalizer, 109, are actuated in the subtractive sense through the gear wheels, 192 and 193.

On the forward longitudinal member, 195, Figure 2, of the carriage, 4, a rail, 197, Figures 2 and 8, is secured by means of the screws, 196. On the rail, 197, a roller, 200, runs, Figure 3, the roller being fixed in the front member, 198, of the paper carriage, 199. The member, 198, is of U-shape and is fixed on the right-hand side by means of the screws, 201, Figures 2, 5, 6 and 8, to the right-hand part, 199a, of the carriage, 199, and on the left-hand side, by means of the screws, 202, Figures 2 and 3, to the left-hand part, 199b, of this carriage. By means of the paper guide plate, 203, Figures 1, 2, 3 and 5, and the supporting rail, 204, Figures 3 and 5, the two side parts, 199a and 199b, of the carriage, 199, are rigidly connected to one another. On the right-hand side part, 199a, of the carriage, 199, a part, 206, is secured by means of the screws, 205, Figures 2, 5, 6 and 8. On the part, 206, a lug, 207, is formed by bending over to the right at a right angle, and on this lug, a roller 209, is rotatably mounted on a shaft, 208. The roller, 209, runs on a rail, 211, of circular section fixed to the rear longitudinal member, 210, of the carriage, 4, by means of screws which are not shown in the drawings.

On the lug, 207, of the part, 206, is fixed a part, 213, which is provided with an opening, 212, Figure 8. With this opening, a hook, 215, provided with a loop, 214, is engaged, to which one end of a draw-band, 216, acting upon the carriage 199, continuously in the direction of the arrow a, is attached. The spring casing, 217, Figures 2 and 5, to which the other end of the draw-band, 216, is secured, is arranged on the right-hand outer side of the carriage, 4. The drawband, 216, passes around a roller, 218, which is rotatably mounted on a part, 219. The part, 219, in turn is secured to the carriage, 4, by means of a screw, 220.

Through an opening, 221, Figure 8, in the right-hand protecting cap, 223, which is fastened by means of the screws, 222, to the right-hand side part, 199a, of the carriage, 199, projects a lever, 224, which raises the lower paper guide rollers, not shown, from the platen, 102. On the part, 206, Figure 8, is a lug, 225, which is bent over to the left and projects through the right-hand side part, 199a, of the carriage, 199. On the lug, 225, a lever, 227, Figures 2 and 8, is pivoted by means of the screw, 226. A tooth, 228, formed on the lever 227, is adapted to act in conjunction with the teeth 229, of a rack, 230, of angle section. A spring, 231, Figures 6 and 8, which at one end is attached to the arm, 232, of the lever, 227, and at its other end which is fastened to a pin, 233, Figure 6, secured to the right-hand side part, 199a, of the carriage, 199, acts upon the lever, 227, in a clockwise direction around the screw, 226, so that the tooth, 228, of this lever is always in engagement with one of the teeth, 229, of the rack, 230. The rack, 230, is provided with a number of screws, 234, Figure 6, which project through elongated holes therein and are not shown in the drawings, so that the rack can be adjusted and locked in position. A part, 236, is fixed to the lever, 227, Figure 8, by means of the screws, 235, the part, 236, acting in conjunction with an angle-shaped rack, 236a, Figure 5, which is arranged on the fixed rear rail, 2. The rack, 236a, has on its horizontal arm, the triangular teeth, 236b to 236e, Figure 2, which are disposed in the path of the part, 236, attached to the lever, 227. If during the movement of the two carriages, 4 and 199, to the left, the part, 236, contacts with one of the teeth, 236b to 236e, then the tooth, 228, of the lever, 227, is disengaged from the corresponding tooth of the rack, 230, and causes the paper carriage, 4, to spring to the right as far as the next tooth of the rack, 230, under the action of the spring, 217.

In order to prevent the above springing movement taking place, which may be desirable for reasons hereinafter described, the rack, 236a, is arranged so that it can be displaced vertically by screws, 236f, Figure 5, which project through long vertical slots in the vertical arm of the rack, 236a. On the right-hand side part of the frame, a lever, 236h, is pivotably mounted on the screw, 236g, and this lever engages with its reduced free end in a hole in the vertical arm of the rack, 236a. A rod, 236i, at one of its ends is connected to the middle point of the lever, 236h, and at its other end is pivotably connected to one end of the lever, 236k, which is pivotably mounted on the screw, 236j, on the right hand side part of the frame. On the other end—the forwardly directed end—of the lever, 236k, there is arranged a spring pin, 236m, which may be engaged by hand with one of the two notches, 236n (in Figure 5 this notch is covered by the spring pin, 236m) and 236o, in the right-hand side part of the frame. If the spring pin, 236m, is in the notch 236n, then the teeth, 236b to 236e, of the rack, 236a, are in the path of the part, 236, which is fixed to the lever, 227, Figure 8, and may, therefore, raise the tooth, 228, of the lever, 227, out of the teeth of the rack, 236a, and this enables the paper carriage, 199, to shift in jumps to the right.

If, however, the spring pin, 236m, is in the notch, 236o, then the rack, 236a, is lowered through the levers, 236k, 236i and 236h, whereby its teeth, 236b to 236e, are moved out of the path of the part, 236, attached to the lever, 227, so that in this case, the two carriages, 4 and 199, can move uninterruptedly and together in uniform steps.

On the screw, 237, Figure 6, the release lever, 238, Figures 6 and 8, is pivotably mounted. On the arm, 239, of the lever, 238, a lug, 240, is formed by bending over at right angles and is adapted to act upon the arm, 232, of the lever, 227, whereby the tooth, 228, of the lever, 227, may be disengaged at any time from the teeth, 229, of the rack, 230, and the paper carriage, 199, displaced independently of the carriage 4. An angle piece, 242, which is secured by means of the screws, 241, to the lug, 207, of the part, 206, Figure 8, projects with its part, 243, which is bent over at a right angle, under the rail, 211, Figure 3, and this prevents the carriage, 199, from being lifted off.

On the part, 198, Figure 3, a U-shaped member, 244, is secured by means of the screws, 245, and projects with its arm, 246, into an undercut part, 247, of the rail, 197, whereby the lifting-off of the carriage, 199, is also prevented at the front side thereof.

On the left-hand side of the carriage, 199, Figures 2, 3 and 9, a member, 249, is fixed to the carriage side part, 199b, by means of the screws, 248. On the part, 250, of this member, which part is bent-over to the left at a right angle, a roller, 251, is rotatably mounted and runs on the already mentioned rail, 211. To the part, 250, is also fixed, by means of the screws, 252, an angle piece, 253, which with its part, 254, which is bent-over at a right angle, projects under the rail, 211, and so prevents the carriage, 199, from being lifted off. On the extended part, 255, of the member, 249, a two-armed lever, 257, is rotatably mounted by means of the screw, 256, a distance piece, 258, being interposed between the lever and the member, 249. The end, 259, of the lever, 257, is bent-over at a right angle, a roller, 260, being rotatably mounted on the end, 259, and acting in conjunction with an angle piece, 262, fixed by means of the screws, 261, to the rear frame.

On the arm, 263, of the lever, 257, a pawl, 265, is pivoted by means of the pin, 264, and the nose, 266, of this pawl is adapted to engage with the teeth, 267, of the line space wheel, 268. A spring, 269, Figure 3, which engages at one end with the stem, 270, of the pawl, 265, and at its other end with a pin, 271, riveted to the lever, 257, acts on the pawl, 265, in an anti-clockwise direction, Figure 3, so as to cause the nose, 266, to be held in engagement with the teeth, 267, of the line space wheel, 268. A spring, 274, which at one of its ends is attached to a pin, 272, on the left-hand side part, 199b, of the carriage 199, and at its other end engages with a pin, 273, of the lever, 257, acts upon the lever, 257, in an anti-clockwise direction around the screw, 256. The rest or normal position of the lever, 257, and the pawl, 265, is determined by a pin, 275, Figure 3, on the pawl contacting with a pin, 276, arranged on the left hand wall, 199b, of the carriage, 199, under the action of the springs, 269 and 274. The pawl, 265, extends upwardly, Figures 3 and 9, through a slot, 265a, Figure 2, of the sheet metal cover of the left-hand side part, 199b, and is provided with a knob, 265b, by means of which the pawl, 265, may be disengaged from the line space wheel, whereupon the platen, 102, may be freely rotated by means of the platen knob, 102a.

On the frame, 1, a stop, 281, is secured in position by means of the screws, 280, Figure 5. If the carriage return key, AT, is depressed, then as is known, the carriage return coupling members, 28 and 30, Figure 1, are engaged by means of levers which are not shown in the drawings, and in consequence, the carriage, 4, and with it, of course, also the carriage, 199, move towards the right. During this movement to the right, the tooth, 228, of the lever, 227, is raised consecutively, out of the zone of the teeth, 229, of the rack, by the action of the teeth, 236e to 236b of the stationary bar 236a, upon the part, 236, of the lever, 227, and this causes the paper carriage, 199, due to pull of spring 217, to move by jumps to the right in relation to the carriage, 4, and this movement will continue until the tooth, 236b, which lies on the extreme right, has come into operation. The stop, 281, prevents the paper carriage, 199, from moving further to the right so that from this point on, only the carriage, 4, can move to the right until it is brought to a stop in a known manner by the opening of the coupling members, 28 and 30, by the left-hand margin setter. During the movement of the carriage, 4, to the right, in relation to the carriage, 199, the teeth, 229, of the rack, 230, of the carriage, 4, slide over the cam, 228, of the lever, 227. The carriages, 4 and 199, are then in the position as shown in Figure 2.

In the following, the working of the arrangement according to the invention, is described, by way of example and by means of a tax return schedule as shown in Figure 10.

This tax return schedule is subdivided by the perforations A to F, into six parts which can be separated from one another. The part which is surrounded by the perforations, A, B and C, is the tax return proper. This contains the final calculation of the tax. On the right-hand edge of this part, i. e., the part immediately on the left of the perforation, C, are the receipts for the quarterly tax payments which must be signed by the post office. On the left, next to the receipt for the third quarter, is the receipt for the payment of the whole amount of the tax.

In the left-hand bottom corner of the schedule, the perforations, A and B, separate the payment voucher for the whole amount of the tax which has to be paid, and on the right-hand side of this are the postal sections which are destined for the taxation department.

This schedule is sent to the tax-payer already filled in and it is then left to him whether he will pay the whole tax in one payment or by instalments.

All the details are printed on the schedule, and it only remains to enter the figures with the typewriting and calculating machine, which are shown in Figure 10, in thick writing sloping to the left.

The address of the tax-payer is also typed by the type keys of the typewriting and calculating machine.

Let is be assumed that the following taxes are to be paid:

The income of the tax-payer is assumed to be..........3,900.— RM.
The State tax..........48.— RM.
Free from taxation are..........10.— RM.
Let the capital be..........6,000.— RM.
The capital tax..........9.— RM.
The local rates..........52.05 RM.
The fire brigade tax..........7.— RM.
The church tax..........5.65 RM.

The following table gives a survey of the column totalizers which are required for filling-in the schedule and the manner of adjusting the cross totalizers, 108 and 109, for which the setting plates, 169a and 168a, of the column totalizers must be adjusted beforehand. This table will serve to explain the method of operation of the arrangement according to the invention which is described in greater detail hereinafter.

| Line No. | Description of tax | Number of column totalizer | Reading column totalizer | Setting cross totalizer 108 | Setting cross totalizer 109 | Reading cross totalizer 108 | Reading cross totalizer 109 | Clear sign from cross totalizer |
|---|---|---|---|---|---|---|---|---|
| 1 | 2 | 3 | 4 | 5 | 6 | 7 | 8 | 9 |
| I | Income | 67 | 3,900.00 | D | D | Zero | Zero | |
| II | Capital | 68 | 6,000.00 | D | D | Zero | Zero | |
| III | Income tax | 69 | 48.00 | A | A | 48.00 | 48.00 | |
| IV | Free from tax | 70 | 10.00 | S | S | −10.00 =38.00 | −10.00 =38.00 | |
| V | Tax to be paid | 71 | 38.00 | S | D | Ret. to zero. | 38.00 | 108 |
| VI | Capital tax | 72 | 9.00 | D | A | Zero | +9.00 =47.00 | |
| VII | Total State tax | 73 | 47.00 | A | S | 47.00 | Ret. to zero | 109 |
| VIII | Local rates | 74 | 52.05 | A | A | +52.05 =99.05 | 52.05 | |
| IX | Fire brigade tax | 75 | 7.00 | A | A | +7.00 =106.05 | +7.00 =59.05 | |
| X | Church tax | 76 | 5.65 | A | A | +5.65 =111.70 | +5.65 =64.70 | |
| XI | Total local rates | 77 | 64.70 | D | S | 111.70 | Ret. to zero | 109 |
| XII | State tax and local rates | 78 | 111.70 | S | A | Ret. to zero. | 111.70 | 108 |
| XIII | Receipt for total amount of taxes. | 79 | Blank | A | S | 111.70 | Ret. to zero | 109 |
| XIV | 2% discount | 80 | Blank | S | A | −1.65 =110.05 | +1.65 =1.65 | |
| XV | Tax for year cash payment. | 81 | Blank | S | A | −110.05 Ret. to zero. | +110.05 =111.70 | 108 |
| XVI | Pay-in slip total taxes | 82 | Blank | A | S | 111.70 | Ret. to zero | 109 |
| XVII | 2% discount | 83 | Blank | S | A | −1.65 =110.05 | +1.65 =1.65 | |
| XVIII | Tax for year cash payment. | 84 | Blank | S | A | −110.05 Ret. to zero. | +110.05 =110.70 | 108 |
| XIX | Receipt 1st quarter | 85 | Blank | A | S | +29.20 =29.20 | −29.20 =82.50 | |
| XX | Receipt 2nd quarter | 86 | Blank | A | S | +27.50 =56.70 | −27.50 =55.00 | |
| XXI | Receipt 3rd quarter | 87 | Blank | A | S | +27.50 =84.20 | −27.50 =27.50 | |

| Line No. | Description of tax | Number of column totalizer | Reading column totalizer | Setting cross totalizer 108 | Setting cross totalizer 109 | Reading cross totalizer 108 | Reading cross totalizer 109 | Clear sign from cross totalizer |
|---|---|---|---|---|---|---|---|---|
| 1 | 2 | 3 | 4 | 5 | 6 | 7 | 8 | 9 |
| XXII | Receipt 4th quarter | 88 | Blank | A | S | +27.50 =111.70 | −27.50 Ret. to zero. | 109 |
| XXIII | Pay-in slip 1st quarter | 89 | Blank | S | D | −29.20 =82.50 | Zero | |
| XXIV | Pay-in slip 2nd quarter | 90 | Blank | S | D | −27.50 =55.00 | Zero | |
| XXV | Pay-in slip 3rd quarter | 91 | Blank | S | D | −27.50 =27.50 | Zero | |
| XXVI | Pay-in slip 4th quarter | 91a | Blank | S | D | −27.50 Ret. to zero. | Zero | 108 |

A=addition; S=subtraction; D=disengaged.

In order to perform this calculation, it is necessary in the first place to set the two cross totalizers, 108 and 109, with the column totalizers, 67 to 91a, for operation according to the above table by means of the knobs, 170a and 171. The respective adjustment of the setting plates, 168a and 169a, of the column totalizers, 67 to 91a, Figure 7, will be described before describing the manner in which the individual column totalizers are forwarded to the operative position. Of the column totalizers, 67 to 91a, which are arranged on the support rail, T, the totalizers, 67 to 78, are actual complete totalizers, while the totalizers, 79 to 91a, are blank. The totalizers which are blanks, and which as known consist only of totalizer casings and have no interior mechanism such as gears, number wheels, etc., serve merely for adjusting the cross totalizers, 108 and 109, to the positions of "Addition", "Disengaged" and "Subtraction".

After all the column totalizers, 67 to 91a, have been adjusted, and the two carriages, 4 and 199, have been moved into their position, as shown in Figure 2a, the address of the taxpayer is typed. As may be seen from that figure, by means of the index I, the two carriages are displaced somewhat to the left, in which position the roller 260 of the lever 257 assumes the position according to line x, which line with regard to Figure 10, corresponds to the left hand side of the printing point on the platen 102. As in the relative positions of the carriages 4 and 199 according to Figure 2a, the tooth 228 of the lever 227 is in engagement with the first teeth 229a of the rack 230 of the carriage 4, the carriage 199 participates in the movement of the left of the carriage 4. Although the same is true with regard to Figures 2 and 2b, reference may be had, for the present, only to Figure 2a. Now, inasmuch as the carriage 199 would jump to the right as soon as the part, 236, of the lever, 227, runs up on the tooth, 236b, and this action must, of necessity, be prevented while the address is being typed or for that matter, during the typing of any text. The teeth, 236b to 236e, are, in such circumstances, rendered inoperative by positioning the spring pin, 236m, Figure 5, in the notch, 236o, and thus these teeth do not act upon the part, 236, of the lever, 227. Thereafter the name "Herman Müller" is typed by striking the type keys, ST, Figure 2a.

After the name "Hermann Müller" has been typed, the two carriages 4 and 199 have moved so far to the left that the roller 260 of the lever 257, assumes the position according to line z (Fig. 2b) which position corresponds to the line z on the form (Fig. 10). In this position, as may be clearly seen from Fig. 2b, the roller 260 lies still on the horizontal edge of the angle piece 262.

The carriage return key, AT, is now depressed and the coupling members, 28 and 30, are thereby engaged so that the two carriages, 4 and 199, are moved together into their right-hand position in which, as already stated, the coupling members are disengaged by the left-hand margin setter, Rx, and the carriages 4 and 199, accordingly come to rest. Inasmuch as during the movement of the two carriages 4 and 199 to the right, the roller 260 of the lever 257 has travelled on the horizontal edge of the angle piece 262, no line spacing movement was brought about. However, in order to write the word "Adorf", the form has to be advanced to the next line. This may be easily accomplished by pulling the knob 265b (Fig. 9) to the front, whereby the pawl 265 is disengaged from the line space wheel while on the other hand, the platen 102 is rotated in the direction of the arrow 268a until the next line is in writing position. Thereupon the carriages 4 and 199 are moved to the left by depressing the space bar L until the printing point for the letter "A" (Fig. 10) of the word "Adorf" is in writing position.

Now the address "Adorf" is typed and the process which has just been described is repeated. After a further return movement of the carriage, the number "1560" and the name of the street are typed. As may be seen from Fig. 10, the number "45" of the street stands beyond the line z. Consequently the carriages 4 and 199 have been moved so far to the left of the line z in Figure 2b, that the roller 260 of the lever 25 moves off from the bevel 262a of the angle piece 262. The pawl 265 (Fig. 9) accordingly slides over the teeth 267 of the line space wheel 268. Now the carriage return key AT is again depressed. During the movement of the two carriages to the right, the roller 260 of the lever 257 has travelled up on the bevel p of the angle piece 262 so that the lever 257 is caused to swing in a clockwise direction. Consequently, the pawl 265 rotates the line space wheel 268 and with it the platen 102 and the schedule in the direction of the arrow 268a. As in the above operation, the schedule is not moved up to the level of the line, I, the pawl, 265, is disengaged from the line space wheel, 268, and then by operating the knob, 265b, with the assistance of the knob, 102a, Figure 2, the platen, 102, is rotated in the direction of the arrow, 268a, until the line, I, is in the typing position.

The teeth, 236b to 236c, are now brought, by the operation of the lever, 236k, into the position shown in Figure 5, in which they act upon the part, 236, Figure 8, of the lever, 227.

The two carriages 4 and 199 are again in their extreme right hand position according to Fig. 2, in which position the roller 260 assumes the position according to line y, following to which the printing point on the platen 102 corresponds equally to the line y of the schedule, indicated in Fig. 10. From this, it may be seen that the roller 260 may never be permitted to drop down at the right of the angle piece 262 since the carriages come always to rest in the position according to Fig. 2, owing to the fact that the coupling members 28 and 30 of the carriage return mechanism are, as already mentioned above, disengaged by the left-hand margin setter Rx as soon as the carriages assume their position according to Fig. 2. Inasmuch as now the line I (Fig. 10) is in writing position and the carriages 4 and 199 assume their position according to Fig. 2, the amount 3900.00 may be registered.

By means of the calculating keys, R, the income amounting to RM 3900.00 is registered in the column totalizer, 67, Figure 7, but it is not registered in the two cross totalizers, 108 and 109, as the adjusting plates, 168a and 169a, of the column totalizer, 67, are adjusted to the "disengaged" position. The following mechanisms are operated in the above operation.

After the carriages, 4 and 199, have been moved into the "thousands" decimal position of the line numbered I, of the schedule, by means of the tabulator key, T 1000, whereby the column totalizer, 67, also moves into the operative position which corresponds to the "thousands" position, the calculating key, R, which corresponds to the figure "3" is depressed. The corresponding key lever, 42, Figure 3, is thus swung in a clockwise direction around the shaft, 43, whereby the arm, 49, of this lever is disengaged from the nose, 58, of the pawl, 50, and consequently the pawl, is released. Under the action of the spring, 52, the pawl, 50, is now moved in the direction of the arrow, d, and with its nose, 53, engages with the ratchet wheel, 40, which rotates continuously. When the key lever, 42, is depressed, the hook, 56, of the member, 54, is moved, under the action of the spring, 55, under the stop bar, 48, and the key lever, 42, is thus held in its depressed position. As the cam, 51, participates in the rotational movement of the driving shaft, 39, the corresponding differential member, 60, moves in a downward direction. The slot, 61, formed on the differential member, 60, and shaped to correspond to the value of the key which has been depressed, acts upon the shaft, 62, of the oscillatory frame, 64—65, 62—64, which is rotatably mounted on the shaft, 63, whereby the shaft, 63, rotates through an angle corresponding to the value of the key which has been depressed, and registers the corresponding amount by means of the one-way toothed segment, 66, and through known mechanism, in the column totalizer, 67, in an additive sense.

During the downward movement of the differential member, 60, the angle member, 92, attached to it, acts upon the corresponding type key lever, 95, which, by means of the pawl, 98, brings the coupling hook, 99, into engagement with the toothed shaft, N, the resulting movement of the coupling hook through the intermediate lever, 106, causing the corresponding type lever, 101, to strike the platen, 102, whereby the amount corresponding to the value of the key which has been depressed, is typed on the schedule. At the same time, through the links, 103 to 105, the carriage escapement, W, is disengaged by the type lever, 101, so that the carriage, 4, by means of the usual spring drum W1, will move one step to the left and, as the tooth, 228, of the lever, 227, engages with the tooth, 229a, Figure 2, of the rack, 230, the carriage, 199, will move as well as the carriage, 4.

The operation which has just been described will be repeated at each step until the amount "RM 3900.00" has been registered in the column totalizer, 67.

In consequence of the fact that in typing the last zero in the Pfennige position, the carriage has moved by one step, the part, 236, Figure 8, of the lever, 227, has run up on the tooth, 236b, Figure 2, of the rack, 236a, and caused the tooth, 228, of the lever, 227, to disengage from the tooth, 229a, of the rack, 230, so that the carriage, 199, under the tension of the spring which is arranged in the casing, 217, may move to the right, relatively to the lower carriage, 4. But as the spring, 231, which is attached to the lever, 227, Figure 8, acts upon this lever, as soon as the tooth, 228, has been disengaged from the tooth, 229a, of the rack, 230, the carriage, 199, can move to the right only until the tooth, 228, engages with the next following tooth, 229b, of the rack, 230. During the movement to the right of the carriage 199, the line spacing mechanism has not been operated since the roller 260 has not left the horizontal edge of the angle piece 262 during the previous leftward movement of the carriages.

In order to bring the schedule level with the line designated by II, the platen, 102, is rotated by means of the knob, 102a, until the line, II, is in the typing position.

The two cross totalizers, 108 and 109, which, during the movement of the carriage to the left, have been carried along by the coupling members, 165, 163, have also moved back into their right-hand position during the typing of the Pfennige units.

But, as the two setting plates, 168a and 169a, of the column totalizer, 67, are adjusted to "disengaged", the cross totalizers have not registered any amount, i. e. they are at zero.

The tabulator key, T1000, is again depressed whereby, the two carriages 4 and 199, move together into the "thousands" position, i. e., the position immediately and vertically below the "3" of the already registered amount "3900.00", on the schedule, the typing line, II, is in the typing position, while the "thousands" position of the column totalizer, 68, is in the operative position.

After the amount "6000.00" has been registered in the same way as the amount "3900.00", the carriage, 199, springs to the right in relation to the carriage, 4, in the manner above described, whereby the former carriage is held fast by the engagement of the tooth, 228, of its lever, 227, with the tooth, 229c, of the rack, 230, so that the column totalizer, 69, is located with its highest place, in the operative position, while the edge, M, Figure 2, of the figure column of the lines, I and II, of the schedule, are opposite the right-hand side wall of the column totalizer, 69.

As now, it is necessary to enter the tax amount "48.00" in the position on the schedule indicated by, III, the upper carriage, 199, must again be moved to the left, relatively to the carriage, 4, into the position as shown in Figure 2b. During this movement, the tooth, 228, of the lever, 227, slides over the teeth, 229b and 229a, of the rack, 230, and engages behind the tooth, 229a.

As the tooth, 229a, now lies on the left of the tooth, 236b, (Fig. 2b), it is no longer possible during the further movement to the left, of the two carriages, 4 and 199, for the tooth, 236b, to act upon the part, 236, of the lever, 227, and the release of the lever, 227, is now effected by the tooth, 236c. The carriage, 199, having now been moved to the left, the tooth, 228, of the lever, 227, is now between the teeth, 236b and 236c, and the edge M2, Figure 2b, of the figure column on the lines, III to XVIII, Figure 10, is positioned opposite to the right-hand side wall of the column totalizer, 69.

The platen, 102, Figure 9, must now be rotated in the direction opposite to that of the arrow, 268a, as far as the line, III, by means of the knob, 102a, while the pawl, 265, is disengaged.

The cross totalizers, 108 and 109, which have also moved back into their right-hand position, are still at zero, as the setting plates, 168a and 169a, of the column totalizer, 68, are adjusted to "disengaged".

The setting plates, 168a and 169a, of the column totalizer, 69, are, however, both adjusted to "addition" so that the amount "48.00" which is to be registered in the column totalizer, 69, will also be registered in the cross totalizer, 108, as well as in the cross totalizer, 109, in an additive sense.

The tabulator key, T10, Figure 2, is now struck, whereby the carriage, 4, and the carriage, 199, are moved into the "tens" decimal position on the line, III, of the schedule, and the column totalizer, 69, is disposed with its "tens" in the operative position.

When the calculating key, R, which corresponds to the value "4" is struck, this amount is again registered in the column totalizer, 69, by means of the parts already mentioned, and is at the same time typed on the schedule. When the carriage 4, moves to the left, the engaging member, 161, which is on the column totalizer, 69, has, of course, also carried along the hook, 165, Figure 1, whereby, by means of the link, 163, the two cross totalizers, 108 and 109, have also been carried along until the cross totalizer, 108, is positioned with its "tens" opposite to the driving wheel, 184, and the "tens" of the cross totalizer, 109, is positioned opposite to the driving wheel, 193, Figure 7. As the setting plates, 168a and 169a, of the column totalizer, 69, are adjusted to "addition" and therefore pass inoperatively over the levers, 172 and 173, the gear wheels, 182 and 192, are in direct mesh with their gear wheels which are not shown in the drawings, whereby the cross totalizers, 108 and 109, are operated in the positive sense and the amount "48.00" is registered at the inspection apertures of the two cross totalizers and also in the column totalizer, 69.

When the last "0" is typed in the Pfennige units position, the cross totalizers, 108 and 109, are disconnected from the column totalizer, 69, and are engaged with the column totalizer, 70. At the same time, in consequence of the step made by the carriage immediately after the striking of the key of the last "0", and also in consequence of the face 236x, of the part, 236, of the lever, 227, contacting with the tooth, 236c, of the rack 236a, the lever, 227, is acted upon in an anti-clockwise direction, whereby the tooth, 228, of the lever, 227, is disengaged from the tooth, 229a, of the rack 230. The tension of the draw-band, 216, causes the carriage, 199, to be pulled in the direction of the arrow, a. During this movement, as the lever, 227, is acted on by the spring, 231, Figure 8, in a clockwise direction, the carriage 199 is retained by the tooth, 229b, of the rack, 230, and the mark, M2, of the schedule, which is shown in Figure 2b, is positioned opposite to the right-hand side plate of the column totalizer, 70.

Inasmuch as the carriages 4 and 199 have travelled from the line z in Fig. 2b to the left, the roller 260 of the lever 257 slid off from the bevel 262a of the angle piece 262, and has now, during the rightward movement of the carriage 199, been acted upon by the bevel 262a of the angle piece, 262, whereby the lever, 257, is swung around the screw, 256, in a clockwise direction and against the action of the spring, 274. As the pawl, 265, which is arranged on the lever, 257, so that it can pivot thereon, is held in engagement with the teeth, 267, of the line space wheel, 268, by the spring, 269, and at the same time participates in the swinging movement of the lever, 257, the line space wheel, 268, is rotated in the direction of the arrow, 268a, shown in Figure 9, and the schedule is shifted to the line, IV.

The carriage, 4, and the carriage, 199, which again moves with it, are now moved by means of the tabulator key, T10, into the "tens" decimal position on the line, IV, of the schedule.

As the amount which is free from tax, i. e., RM 10.00, which is to be inscribed on the line, IV, is to be deducted from the amount of the tax, i. e., "RM 48.00" which is registered in the cross totalizers, 108 and 109, both of the setting plates, 168a and 169a, of the column totalizer, 70, are adjusted to subtraction.

The calculating keys, R, which correspond to the amount "10.00" are now struck, and the amount "10.00" is thereby registered in the column totalizer by means of the already mentioned mechanisms, and is also typed on the schedule. After the striking of each calculating key, the carriage, is, of course, moved for one step by means of the parts, 103, 104 and 105. Furthermore, during the movement of the carriages, 4 and 199, the engaging member, 161, on the column totalizer, 70, carries the cross totalizers, 108 and 109, along with it, by means of the link, 163 and the hook, 165, until the amount registered in the column totalizer, 70, has also been registered in the cross totalizers, 108 and 109. As the setting plates, 168a and 169a, of the column totalizer, 70, are adjusted to subtraction, the setting plate, 168a, acts upon the cranked lever, 173, and disengages it by moving it in an anti-clockwise direction against the action of the spring, 176, whereby the connecting rod, 188, which is pivoted to it, acts upon the lever, 189, in a clockwise direction, so that the gear wheel, which is connected with it and is not shown in the drawings, is brought into mesh with the intermediate gear wheel, 194, and the latter through the gear wheels, 192 and 193, operates the number wheels of the cross totalizer, 109, in a negative sense, and in the cross totalizer, 109, the amount of RM 38.00 becomes visible. At the same time, the setting plate, 169a, of the column totalizer, 70, moves the lever, 172, in a clockwise direction whereby the connecting rod, 179, which is pivotably connected to it, acts upon the lever, 181, in an anti-clockwise direction. This movement of the lever, 181, causes the gear wheel, which is not shown in the drawings, to mesh with the indermediate gear wheel, 187, and this causes the number wheels of the cross totalizer, 108, through the gear wheels, 185 and 184, to rotate in a negative sense and in the inspection aperture in the cross totalizer 108, the amount "RM 38.00" appears too.

As soon as the carriages, 4 and 199, have moved to the position in which the last number position is out of the operative position, the cross totalizers, 108 and 109, spring back to the right and the carriage, 199, is likewise released, so that it moves under the tension of the draw-band, 216, to the right until, the tooth, 228, of the lever, 227, engages with the tooth, 229c, of the rack, 230, under the action of the spring, 231, whereby the edge of the schedule, M2, Figure 2, is now positioned opposite to the right-hand side wall of the column totalizer, 71.

As the roller, 260, of the lever, 257, Figures 2b and 9, runs on to the surface, 262b, of the angle piece, 262, the schedule is caused to move upwards to the line indicated by, V.

The amount which is registered in the cross totalizers, 108 and 109, is now to be withdrawn from the cross totalizer, 108, and is to remain in the cross totalizer, 109, while at the same time, it is to be registered in the column totalizer, 71, and typed on the line, V.

For this purpose, the tabulator key, T10, Figure 2, is again struck, whereby the carriage, 4, and the carriage, 199, move into the "tens" decimal position on the line, V, of the schedule, and the column totalizer, 71, moves into the working position with its "tens" place. As the amount "38.00" is to be withdrawn from the cross totalizer, 108, the setting plate, 169a, of the column totalizer, 71, is adjusted to subtraction and as the amount of RM "38.00" is to remain in the cross totalizer, 109, the setting plate, 168a, is adjusted to "disengaged".

By striking the corresponding calculating keys, the amount which is in the cross totalizer, 108, "38.00", is registered in the column totalizer, 71, and is also typed on the schedule, whereby the cross totalizer, 108, is returned to zero, and the cross totalizer, 109, is not operated at all.

The step movement of the carriage which is caused by the typing from the lowest denominational position of the cross totalizer, 108, causes also the projection, 121, Figures 1 and 4, of the column totalizer, 71, to act upon the hook, 120, of the lever, 118, and moves the latter to the left, so that the lever, 124, releases the lever, 130, whereupon, by means of the parts, 139 and 143, the rake-shaped feeler rail, 147, acts in conjunction with the driving wheels, 149, of the number wheels, B. If now the shortened teeth of the driving wheels, 149, are opposite to the feeler guide rail, 147, in which case the amount "38.00" has been typed correctly, then the feeler rail, 147, may swing in a clockwise direction under the action of a spring, which is attached to it but is not shown in the drawings. The sliding member, 139, is thus caused to move downwards and to swing, by means of the roller, 137, the U-shaped rail, 133, the lever, 130 and the lever, 134, in a clockwise direction around the shaft, 132. This movement causes the lever, 134, to act upon the lever arm, 151, of the lever 150, 152, 155, Figure 3, and to swing it also in a clockwise direction so that the curved slot of the lever, 155, acts upon the lever, 159, Figure 1, whereupon, in a known manner, the type lever which carries the "clear sign" type, impresses the "clear sign" indication (a star) on the schedule after the amount "38.00".

The parts of the "clear sign" impression device which have thus been released for operation, are in a known manner, returned to their positions of rest by the action of the pin arranged on the intermediate lever of the "clear sign" type lever on the link, 158. As the intermediate lever on its forward movement, is swung in a clockwise direction, it moves at the end of its forward movement, by means of its pin, the link, 158, in a direction opposite to that of the arrow, x, whereby the lever, 155, the two-armed lever, 152, 150, 151, and the parts, 134, 133 and 130, are swung in an anti-clockwise direction and therefore, the lever, 124, can move with its notch over the lever, 130, under the action of its spring, 128.

At the same time, the cross totalizers, 108 and 109, are disconnected from the column totalizer, 71, and spring back into their right-hand position in readiness to be carried along by the column totalizer, 72, in the subsequent movement of the carriage, 4, to the left.

Furthermore, as the typing operation at the "units" position causes the carriages to move by one step, and in consequence of the surface, 236x, of the part, 236, of the lever, 227, running up on the tooth, 236c, of the rack, 236a, the carriage, 199, is moved to the right and is disengaged from the tooth, 229c, of the rack, 230, and in this movement to the right, retained by the tooth, 229b, of the rack, 230.

In this movement to the right, the roller, 260, of the lever, 257, is acted upon by the bevel, 262a, of the angle piece, 262, and the line, VI, of the schedule is raised into the typing position. The edge, M2, of the schedule, Figure 2, is thus positioned opposite to the right-hand side wall of the column totalizer, 72.

The tabulator key, T1, Figure 2, is now depressed, whereby the carriage, 4, and the carriage, 199, move into the lowest denominational decimal place on the line, VI, of the schedule.

The calculating keys which correspond to the amount of "RM 9.00" are now actuated whereby in the column totalizer, 72, the amount "9.00" appears and, as the setting plate, 168a, for the cross totalizer, 109, is adjusted to "addition", the amount of "RM 9.00", is added to the amount "RM 38.00", which is already in the cross totalizer, 109, and the amount of "RM 47.00" appears in the inspection aperture. As on the other hand the setting plate, 169a, for the cross totalizer, 108, is adjusted to "disengaged" this amount is not registered in the latter totalizer.

After the amount "RM 9.00" has been registered, the carriage again moves by one step, whereby the cross totalizers, 108 and 109, are detached from the column totalizer, 72, and are engaged by the column totalizer, 73. Furthermore, the lever, 227, is released from the tooth, 229d, and is engaged by the tooth, 229e, of the rack, 230. The schedule is also moved on to the line, VII, by means of the roller, 260, angle piece, 262, lever, 257, pawl, 265 and line space wheel, 268. Now the total State taxes amount, which is in the cross totalizer, 109, is withdrawn from it and brought into the cross totalizer, 108. While the amount of "RM 47.00" is withdrawn from the cross totalizer, 109, this amount is at the same time introduced into the column totalizer, 73.

In consequence of the carriage step movement which is caused by the typing of the amount in the lowest denominational position, the projection, 121, of the column totalizer, 73, acts upon the hook, 119, Figure 4, of the lever, 117, and moves it to the left so that the lever, 125, releases the lever, 131, whereby, by means of the parts, 135, 138, 140, 144, the rake-like feeler rail, 148, acts in conjunction with the driving wheels, 149a, Figure 3, of the number wheels, Ba. If now the shortened teeth of the driving wheels, 149a, are opposite to the feeler rail, 148, then this rail can swing in a clockwise direction under the action of its spring, which is not shown in the drawings. In consequence of the swinging movement of the feeler rail, 148, the slide, 140, moves in a downward direction whereby, by means of the already described parts, 151, 152, and 155, the "clear sign" is typed after the amount "47.00".

After the amount "RM 47.00" has been entered in the column totalizer, 73, and into the cross totalizer, 108, and has been withdrawn from the cross totalizer, 109, and the total tax amounting to "RM 47.00" has been typed on the line, VII, the local rates amounting to "RM 52.05" is typed on the line, VIII, and this amount is entered into both cross totalizers, 108 and 109, so that in the cross totalizer, 108, the amount

RM 47.00+52.05=99.05 is registered while only the amount "52.05" has been registered in the cross totalizer, 109. This amount of course, is at the same time registered in the column totalizer, 74.

The fire brigade tax is typed on the line, IX, and added into both cross totalizers, whereby the totalizer, 108, shows the amount registered as RM 99.05+7=106.05 and the cross totalizer, 109, shows the amount registered as

RM 52.05+7=59.05.

At the same time, the column totalizer, 75, will show the amount "7".

The church tax is also added in the two cross totalizers, 108 and 109, so that now the totalizer, 108, shows the amount registered as

RM 106.05+5.65=111.70 and the cross totalizer, 109, shows the amount registered as RM 59.05+5.65=64.70. At the same time, the church tax is registered in the column totalizer, 76, and is typed on the line, X.

The amount of "RM 64.70"=the total local rates, which is registered in the cross totalizer, 109, is now withdrawn from it while the cross totalizer, 108, is adjusted to "disengaged". In this way, this amount is typed on the line, XI, and is registered in the column totalizer, 77. If the amount "64.70" has been withdrawn correctly out of the cross totalizer, 109, then in the manner above described, the "clear sign" will appear after this amount. Now the amount "111.70" which is in the cross totalizer, 108, is withdrawn, is typed on the line, XII, of the schedule and is at the same time registered in the cross totalizer, 109. If the amount has been withdrawn correctly out of the cross totalizer, 108, the "clear sign" will appear after the amount "111.70".

At the same time this amount is registered in the column totalizer, 78. The other amounts which now follow and which are to be typed on the schedule are not registered in the column totalizers. For this reason, the succeeding column totalizers, 79 to 91a, are blanks and serve only for the control of the type of calculation to be performed by the cross totalizers. The amount "111.70" which is now in the cross totalizer, 109, is typed on the line, XIII, after the latter has been moved into position, whereby, the amount is withdrawn from the cross totalizer, 109, and introduced into the cross totalizer, 108. If the cross totalizer, 109, is at zero, the "clear sign" will again appear after the amount, "111.70". From this amount, 2% discount for the second to the fourth quarter is to be deducted, but while this is deducted from the amount which has been registered in the cross totalizer, 108, it is introduced into the cross totalizer, 109. The 2% discount="1.65 RM" is typed on the line, XIV, of the schedule at the same time as the calculating operation is performed.

The amount which has been registered in the cross totalizer, 108, namely "RM 110.05" is now typed on the line, XV, of the schedule, whereby the cross totalizer, 108, is returned to zero and therefore the "clear sign" appears, while the amount "RM 110.05" is added to the amount "1.65" which is registered in the cross totalizer, 109. The cross totalizer, 109, therefore, again shows the amount "RM 111.70".

After the schedule has moved so that the line, XVI, is in the typing position, the amount, "111.70" is witrdrawn from the cross totalizer, 109, and is at the same time introduced into the cross totalizer, 108, and typed on the schedule. When the amount is withdrawn from the cross totalizer, 109, the "clear sign" again appears. After the schedule has been moved so that the line, XVII, is in the typing position, the 2% discount is deducted from the amount of "111.70" which is registered in the cross totalizer, 108, whereupon, in this totalizer, the amount

"RM 110.05"

appears, while in the cross totalizer, 109, the amount "RM 1.65" appears. The latter is also typed on the schedule on the line, XVII. Now the amount of "RM 110.05" which can be seen in the cross totalizer, 108, is typed on the line, XVIII, whereby the cross totalizer, 108, returns to zero, the "clear sign" star appears and the amount "RM 111.70" appears in the inspection aperture of the cross totalizer, 109.

As this is the last amount to be entered in the vertical column, and the remaining amounts are to be entered into the column for receipts, the schedule must, in the first place, be moved so that the line, XIX, is in the typing position, and this is effected by disengaging the pawl, 265, by means of the knob, 265b, and rotating the platen, 102, Figure 9, by means of the knob, 102a, Figure 2, so far in the opposite direction to that of the arrow, 268a, Figure 9, that the line, XIX, is in the typing position.

The schedule is now positioned with the column containing the type lines, III to XVIII, opposite to the typing position, i. e. the mark, M2, Figure 2, is now opposite to the right-hand side wall of the blank column totalizer, 85, and the tooth, 228, of the lever, 227, is in engagement with the tooth, 229q, of the rack, 230. In order to bring the schedule into the column of the typing lines, XIX to XXII, the upper carriage, 199, is moved in relation to the lower carriage, 4, so far to the left that the mark, M3, is positioned opposite to the right-hand side wall of the blank totalizer, 85, whereby the tooth, 228, which until then, as already stated, had engaged with the tooth, 229q, is now positioned again behind the tooth, 229p. Consequently, the roller 260 of the lever 257 is displaced further to the left of line Z (Figures 2, 2a and 2b), namely, through that distance which coresponds to the distance from the mark M2 to the mark M3. In other words, henceforth the roller 260 is no longer in contact with the angle piece 262, so that any line spacing movement has to be effected by hand.

In this position of the two carriages, 4 and 199, the tooth, 229p, lies between the teeth, 236c and 236d, of the rack, 236a, that is, at each further step to the left of the two carriages, the tooth, 228, of the lever, 227, will no longer be disengaged by means of the tooth, 236c, but by the tooth, 236d, from the teeth of the rack, 230.

The tabulator key, T10, is again depressed, whereby the two carriages move to the "tens" decimal place on the line, XIX, and of the cross totalizers.

The amount "RM 29.20", is then subtracted from the amount "RM 111.70" which is in the cross totalizer, 109, so that the totalizer now shows the amount "RM 82.50", while the amount "RM 29.20" is registered in the cross totalizer, 108.

When the amount "RM 27.50" is typed on the lines, XX to XXII, the same is added each time in the cross totalizer, 108, and subtracted in the cross totalizer, 109, so that after the last amount has been typed, the cross totalizer, 109, is at zero and the cross totalizer, 108, will show the amount "RM 111.70".

After the amount typed on the line, XXII, the "clear sign" will now be impressed. The mark, M3, is positioned again opposite to the right-hand side wall of the blank column totalizer, 89, because the tooth, 228, is again disengaged, and in this position the end, 102b, of the knob, 102a, will be only at a very small distance from the inner side of the right-hand transverse member of the carriage, 4. The amounts are now to be typed on the slips which are on the right-hand edge of the schedule. For this purpose, the upper carriage, 4, is moved to the left until the mark, M4, is positioned opposite to the right-hand side wall of the blank column totalizer, 89, whereby the tooth, 228, is disposed behind the tooth, 229m, of the rack, 230.

Accordingly, also the roller 260 of the lever 257 is displaced still further to the left as above indicated, that is, its distance from the line z (Figures 2, 2a and 2b) corresponds now to the distance from mark M2 to mark M4.

In this position, the part, 236, which is arranged on the lever, 227, has slid over the tooth, 236d, of the rack, 236a, and is now one width of the totalizer to the right of the tooth, 236e, of the rack, 236a, so that when the two carriages move further to the left, the tooth, 236e, will release the lever, 227.

The platen, 102, is now rotated backwards by means of the knob, 102a, in the direction opposite to that of the arrow, 268a, until the line, XXIII, is in the typing position.

By depressing the tabulator key, T10, the carriages are again moved into the correct decimal position and the amount "RM 29.20" is typed on the line, XXIII. When the amount "RM 29.20" is typed on the line, XXIII, the amount "27.50" on the line, XXIV, the amount "27.50" on the line, XXV, and finally the amount "27.50" on the line, XXVI, of the schedule, these separate amounts are deducted from the amount registered in the cross totalizer, 108, while the cross totalizer, 109, is adjusted to "disengaged". When the last amount "27.50" is withdrawn from the cross totalizer, 108, the "clear sign" will appear after the last amount.

The above arrangement therefore provides a constant control for the correct transfer of the amounts. Although no control sign is printed, in connection with the amounts on the lines, XIX to XXI, and XXIII to XXV, no mistake can occur as the typist can only type on the lines, XXII and XXVI, that amount which is in the cross totalizer, so that the "clear sign" which is typed after the last quarterly amount is also a control for the correct total amount of the four quarterly instalments.

The carriage step movement which is released by the typing of the last "clear sign" acts upon the margin setter, Rr, which is arranged close to the right-hand column totalizer, 91a, and causes it to actuate the mechanism, not shown in the drawings, connected with the carriage return coupling members, 28 and 30. The latter are thus engaged and the carriages, 4 and 199, move to the right. In this movement, the carriage, 199, moves in stages to the right, relatively to the carriage, 4, until the part, 236, which is arranged on the lever, 27, has passed all the teeth, 236e to 236b. When this has taken place, the carriage, 199, comes to rest with its right-hand side against the stop, 281, Figure 5, and the carriage, 4, moves to the right alone, whereby the part, 236, slides over the teeth of the rack, 230. When the carriage, 4, arrives at its extreme right-hand position, the left-hand margin setter, Rx, acts again on the mechanism for operating the carriage return coupling members, 28 and 30, and disengages these members, thereby bringing the carriage, 4, to rest. The two carriages, 4 and 199, are then in their normal position as shown in Figure 2.

The rack, 230, which is exchangeable, may also be a smooth rack similar to a tabulator stop rail on which the teeth which release the lever, 227, can be arranged like tabulator stops in such a manner that they can be adjusted in position, and by this means the adjustment of the arrangement to any form of schedule is possible.

It is also not necessary that the teeth, 236b to 236e, should be of one piece with the rack, 236a. They can, instead, be arranged on the part, 236a, as adjustable stops. It remains to be added that the machine may be changed at any time within a few minutes into a normally working typewriting and calculating machine. All that is required to be done, is to unscrew the connecting pieces, 242, 244, Figure 3, and 254, Figure 9, of the upper carriage, 199, whereafter the latter can be lifted off. After this the platen frame which corresponds to the length of the carriage frame, 4, is inserted in the frame, 4, and then the machine can be used in the manner already known.

Having now particularly described and ascertained the nature of my said invention and in what manner the same is to be performed, I declare that what I claim is:—

1. In a typewriting and calculating machine, the combination of a main carriage, means for moving said main carriage, an auxiliary carriage mounted in said main carriage, means for moving said auxiliary carriage relatively to said main carriage, means for retaining said carriages in positioned relation, together with means operated by the movement of both said carriages for releasing said retaining means.

2. In a typewriting and calculating machine, the combination of a main carriage, an auxiliary carriage mounted on the main carriage, means for retaining said carriages in positioned relation, means operated by the movement of both carriages for releasing said retaining means, and manipulative means for setting said releasing means to operative or inoperative position at the will of the operator.

3. In a typewriting and calculating machine, the combination of a main carriage, an auxiliary carriage slidably mounted in said main carriage, a platen fixed in said auxiliary carriage, separate means for moving said carriage and said platen in opposite directions, one of said moving means acting between said carriage and said platen, and coupling means for holding said platen in positioned relation to said main carriage against the action of said last named moving means.

4. In a typewriting and calculating machine, a carriage escapement, a main carriage associated with the carriage escapement, an auxiliary carriage comprising a platen moving in unison with said main carriage, and means for automatically displacing said auxiliary carriage with relation to said main carriage at predetermined intervals in the travel of said main carriage, said auxiliary carriage being slidably and removably mounted in said main carriage.

5. In a typewriting and calculating machine, a main carriage, an auxiliary carriage slidably mounted in said main carriage, a platen on said auxiliary carriage, a spring associated with said auxiliary carriage, and coupling means for said carriages, said coupling means comprising a rack mounted in said main carriage, and retaining means rockably mounted on said auxiliary carriage and cooperating with the teeth of said rack, said rack and retaining means acting to hold the auxiliary carriage against the action of the spring and means for automatically disengaging said retaining means from the teeth of said rack during travel of said carriages.

6. In a typewriting and calculating machine, a main carriage, an auxiliary carriage slidably mounted in said main carriage, a platen on said auxiliary carriage, a spring associated with said auxiliary carriage, and coupling means for said carriages, said coupling means comprising a rack mounted in said main carriage, a retaining pawl rockably mounted on said auxiliary carriage and cooperating with the teeth of said rack for holding the auxiliary carriage against the action of said spring in its actual position relatively to the main carriage, a controlling member arranged relatively to said retaining pawl, said controlling member lifting said retaining pawl automatically out of the teeth of the rack at predetermined points in the travel of said carriages.

7. In a typewriting and calculating machine, a main carriage, an auxiliary carriage slidably mounted in said main carriage, a platen on said auxiliary carriage, a spring associated with said auxiliary carriage and coupling means for said carriages, said coupling means comprising a rack mounted in said main carriage, a retaining pawl rockably mounted on said auxiliary carriage and cooperating with the teeth of said rack for holding the auxiliary carriage against the action of said spring in its actual position, relatively to the main carriage, a controlling member arranged relatively to said retaining pawl, releasing cams associated with said controlling member for lifting said retaining pawl automatically out of the teeth of said rack, said releasing cams and the teeth of said rack being adjustably arranged on the members carrying them.

8. The combination of a main carriage, an auxiliary work-sheet-carrying carriage mounted to travel therewith and for independent traveling movement thereon, and automatically operating means dependent on the travel of the main carriage in the direction of its feed for effecting such independent movement of the auxiliary work-sheet-carrying carriage.

9. The combination of a main carriage, an auxiliary work-sheet-carrying carriage mounted thereon, and automatically operating means for causing said auxiliary work-sheet-carrying carriage to travel with the main carriage in the direction of the feed of the latter and to travel in the opposite direction independently thereof, the construction and arrangement of the parts being such that said independent movement of said auxiliary carriage is automatically effected at a predetermined point in the advance of the main carriage in the direction of its feed.

10. The combination of a main carriage, an auxiliary work-sheet-carrying carriage mounted thereon, means for connecting said auxiliary carriage to travel with said main carriage in the direction of the feed of the latter, and automatically operating means operable at a predetermined point in the advance of the main carriage in the direction of its feed for effecting a release of said connecting means and for bringing about an independent travel of said auxiliary carriage on the main carriage in a direction opposite to that of the feed of the main carriage.

11. The combination of a main carriage, an auxiliary work-sheet-carrying carriage mounted to travel therewith and for independent traveling movement thereon, and automatically operating means for effecting such independent movement of the auxiliary work-sheet-carrying carriage comprising means for connecting the two carriages to travel together, automatically operating means for breaking said connecting means when the two carriages reach a given point in their advance together in the direction of the feed of the main carriage, means for returning the auxiliary carriage in an opposite direction when said connecting means are broken, and automatically operating means controlling said connecting means to reestablish the connection between the two carriages when the auxiliary carriage reaches the limit of its return movement.

12. The combination of a main carriage, an auxiliary work-sheet-carrying carriage mounted to travel therewith and for independent traveling movement thereon, and automatically operating means for effecting such independent movement of the auxiliary work-sheet-carrying carriage comprising means for connecting the two carriages to travel together, automatically operating means for breaking said connecting means when the two carriages reach a predetermined point in their advance together in the direction of the feed of the main carriage, means for returning the auxiliary carriage in an opposite direction when said connecting means are broken, automatically operating means controlling said connecting means to reestablish the connection between the two carriages when the auxiliary carriage reaches a predetermined point in its return movement, and adjusting means for varying said predetermined points at which the control of the connecting means functions.

13. The combination of a main carriage, an auxiliary work-sheet-carrying carriage mounted thereon, automatically operating means for causing said auxiliary work-sheet-carrying carriage to travel with the main carriage in the direction of the feed of the latter and to travel in the opposite direction independently thereof, the construction and arrangement of the parts being such that said independent movement of said auxiliary carriage is effected at a predetermined point in the advance of the main carriage in the direction of its feed, and automatically operating means for effecting a line spacing of the work sheet carried by said auxiliary carriage at each of said independent movements thereof.

14. The combination of a main carriage, an auxiliary work-sheet-carrying carriage mounted thereon, means for connecting said auxiliary carriage to travel with said main carriage in the direction of the feed of the latter, automatically operating means operable at a predetermined point in the advance of the main carriage in the direction of its feed for effecting a release of said connecting means and for bringing about an independent travel of said auxiliary carriage on the main carriage in a direction opposite to that of the feed of the main carriage, and automatically operating means for effecting a line spacing of the work sheet carried by said auxiliary carriage at each of said independent movements thereof.

15. The combination of a main carriage, an auxiliary work-sheet-carrying carriage mounted to travel therewith and for independent traveling movement thereon, and automatically operating means for effecting such independent movement of the auxiliary work-sheet-carrying carriage comprising means for connecting the two carriages to travel together, automatically operating means for breaking said connecting means when the two carriages reach a given point in their advance together in the direction of the feed of the main carriage, means for returning the auxiliary carriage in an opposite direction when said connecting means are broken, automatically operating means controlling said connecting means to reestablish the connection between the two carriages when the auxiliary carriage reaches the limit of its return movement, and automatically actuated means controlled by each of said return movements of the auxiliary carriage for effecting a line spacing of the work sheet carried thereby.

16. The combination of a main carriage, an auxiliary work-sheet-carrying carriage mounted to travel therewith and for independent traveling movement thereon, and automatically operating means for effecting such independent movement of the auxiliary work-sheet-carrying carriage, said automatically operating means comprising a latch for locking the carriages to travel in unison in the direction of feed of the main carriage, means for automatically releasing said latch from engagement at a predetermined point in the travel of the main carriage in such direction, means for returning the auxiliary carriage when it is thus released from control of said latch, means for arresting the auxiliary carriage at a predetermined point in its return with the main carriage, and means for releasing said latch from engagement when the auxiliary carriage has been arrested in said return movement with the main carriage, thus affording a further return movement of the main carriage.

17. In a typewriting and calculating machine, a main carriage, an auxiliary carriage slidably mounted in said main carriage, a platen on said auxiliary carriage, line spacing means for said platen including a lever on said auxiliary carriage and a stationary cam co-operating with said lever, a spring between said main carriage and said auxiliary carriage, means for holding said auxiliary carriage against the action of said spring in positioned relation to said totalizer carriage, means for automatically releasing said holding means at predetermined points in the travel of said carriages to cause said auxiliary carriage to be displaced relatively to said main carriage by said spring to enable said lever to be operated by said cam for line spacing said platen, and manipulative means for rendering said line spacing means selectively inoperative.

ROBERT ANSCHÜTZ.